Feb. 10, 1959   G. G. LANDIS   2,873,357
ELECTRODE HOLDER
Filed Jan. 10, 1955   2 Sheets-Sheet 1
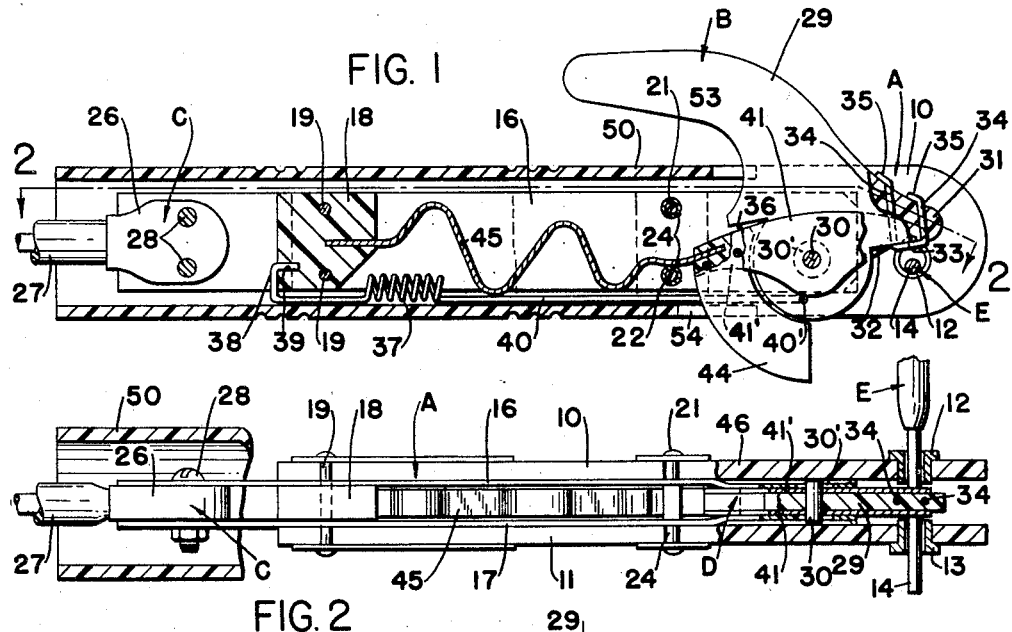
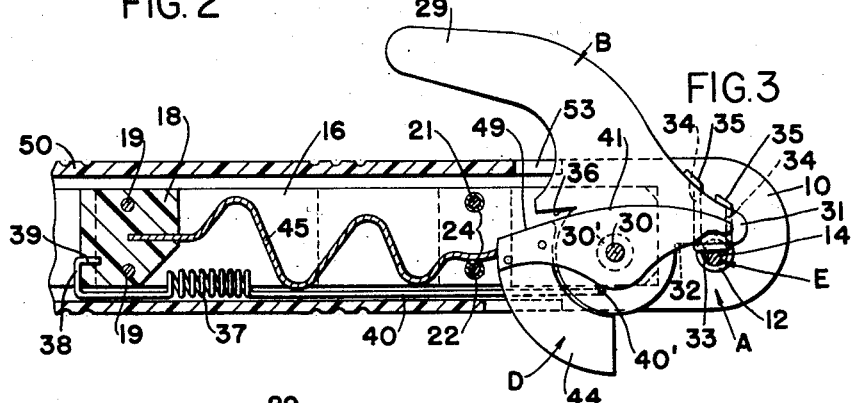
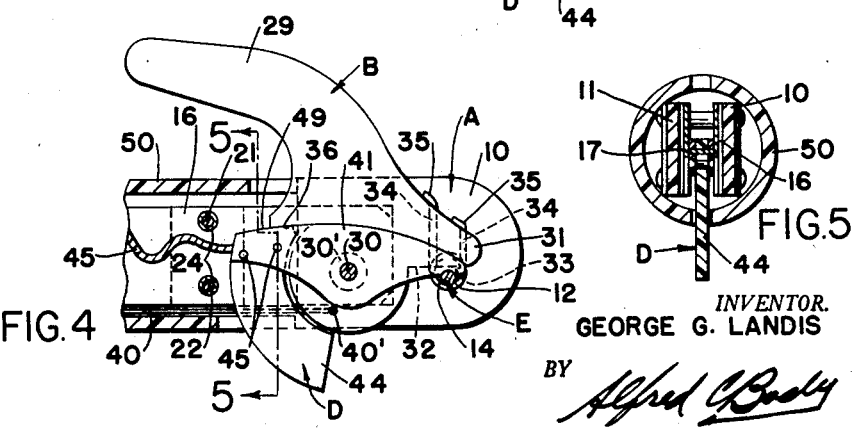
INVENTOR.
GEORGE G. LANDIS
BY Alfred C. Body
ATTORNEY

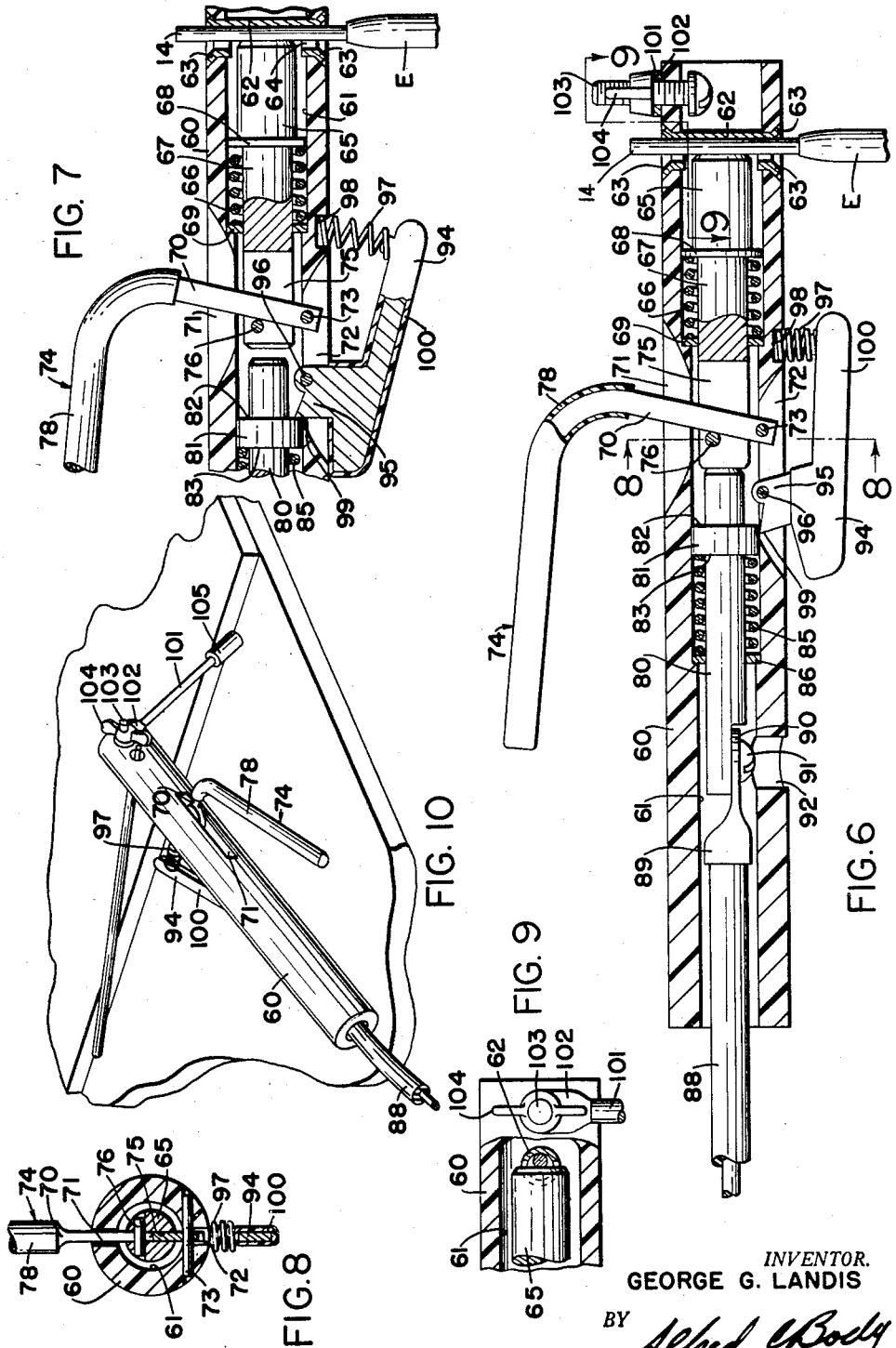

in one type of welding after touching the electrode to the work at the exact spot where it is desired to start welding which spot may be thus accurately located with the eye shield removed.

2,873,357

ELECTRODE HOLDER

George G. Landis, South Euclid, Ohio, assignor to The Lincoln Electric Company, Cleveland, Ohio, a corporation of Ohio Application January 10, 1955, Serial No. 480,901

13 Claims. (Cl. 219—138)

This invention pertains to the art of electric arc welding and, more particularly, to an electrode holder for use in such welding.

In the art of arc welding, the electrode holding jaws of the electrode holder are usually electrically energized at all times and when an electrode is inserted in these jaws, it becomes electrically energized. Such a practice presents the danger of electric shock to the welding operator when he either inserts or removes an electrode from the jaws. Further, there is danger that the energized electrode end will accidentally strike the workpiece, thus striking an arc before it is desired. Another problem has been in locating the starting point of the weld. The operator must shield his eyes before bringing the electrode end into contact with the workpiece. Locating the starting point of the weld is, in effect, done blind.

It has heretofore been known to provide an electrode holder with a built-in switch which either directly controls the electrical connection of the jaws to the power source or which is connected to the power source to turn it on or off. In the latter event, unduly complicated electrical connections are required. In the former arrangement, the switch has been of the normally open type and had to be held closed by the welding operator during the welding operation. If the switch was accidentally released during the welding operation, an arc resulted across its contacts of sufficient intensity to destroy the switch.

It has also been proposed to provide a holder with a built-in switch which opens when the electrode jaws are opened to receive a new electrode and then automatically recloses when the electrode holder jaws are reclosed. Such a construction, while avoiding the problem of shock, does not avoid the other difficulties above referred to.

Still another problem in the art of arc welding has been holding the electrode end in proper relation to the workpiece during the welding operation. This is particularly so for the novice and ordinarily much skill is required to properly steady the holder and the electrode relative to the workpiece during the welding operation.

The present invention contemplates an arc welding electrode holder which overcomes all of the above referred to difficulties and others, which has a foolproof control of the electrode energization and which enables good welds to be effected by inexperienced welders.

In accordance with the present invention, a holder is provided having in combination manually operable electrode clamping means or jaws, electrical contacts controlling the energization of an electrode in the jaws operatively associated with such means, and manually releasable means for holding such contacts in the open position after manipulation of such jaws to receive an electrode.

Thus the act of inserting an electrode into the holder automatically results in the electrode being deenergized; it remains so until the welding operator desires to start welding. The electrode may be energized at any time either before touching the electrode to the workpiece or Further in accordance with the invention, an electrode holder is provided having a member extending laterally therefrom and at an angle to the electrode adapted to rest against a fixed support such as the workpiece during welding, the arrangement being such that the holder and electrode may pivot about the end of the member as the electrode is consumed during the welding.

Thus the holder and electrode in the hands of an inexperienced welding operator may be steadied during welding. In fact in some types of welding it is possible to position the holder, member and electrode on the workpiece relative to the desired weld seam that it is not necessary for the welding operator to touch the holder during the welding operation.

The principal object of the invention is the provision of a new improved electrode holder having a switching arrangement for controlling the energization of the electrode, which is automatically opened upon manipulation of the holder to receive an electrode and is independently closed at the will of the welding operator.

Another object of the invention is the provision of a new and improved electrode holder having electrode holding jaws and a switch arrangement for controlling the energization of the electrode operatively associated with the jaws such that manipulation of the jaws automatically opens the switch and holds it open, the switch being closable only at the will of the welding operator.

Still another object of the invention is the provision of a new and improved electrode holder having electrode holding jaws and a toggle type switching arrangement for controlling the energization of an electrode in the jaws, such switch being operatively associated with such jaws whereby it is opened upon manipulation of the jaws to receive an electrode and has independently operated means for closing same.

Still another object of the invention is the provision of a new and improved electrode holder including a power connection, clamping means for holding an electrode in such holder, an electrically conductive member connected to such power connection and biased toward the electrode, means for simultaneously opening the clamping means and moving the electrically conductive member away from the electrode and manually operated means for releasably holding such conductive member in the open position.

Still another object of the invention is the provision of a new and improved electrode holder having a power connection and clamping means for holding an electrode in such holder including an electrically conductive member, a contact member biased toward such conductive member and connected to the power connection, means for moving the conductive member out of clamping engagement with the electrode and against the bias of the contact member, and manually releasable means for holding such contact member against its bias when the conductive member is released into clamping engagement with an electrode.

Still another object of the invention is the provision of a new and improved electrode holder having means extending at an angle from the axis of the holder and the axis of the electrode for engaging the surface of the workpiece and steadying the holder during a welding operation.

Yet another object of the invention is a new and improved electrode holder having a relatively fixed point about which the electrode and holder may be pivoted during a welding operation.

The invention may be embodied in certain parts and arrangement of parts, preferred embodiments of which will be described in detail in this specification and illustrated in the accompanying drawing which is a part hereof, and wherein:

Figure 1 is a cross-sectional view of an electrode holder embodying the present invention showing an electrode supported therein but with the clamping means and switching arrangement open;

Figure 2 is a cross-sectional view of Figure 1 taken approximately on the line 2—2 thereof;

Figure 3 is a fragmentary view of Figure 1 showing the electrode clamped in the holder and with the switching arrangement open;

Figure 4 is another view similar to Figure 3 showing the electrode clamped in position and with the switching arrangement closed so as to electrically energize the electrode;

Figure 5 is a cross-sectional view of Figure 4 taken approximately on the line 5—5 thereof;

Figure 6 is a cross-sectional view of an electrode holder illustrating an alternative embodiment of the invention and showing an electrode clamped in position and the switching arrangement in the closed position;

Figure 7 is a fragmentary view similar to Figure 6 showing a switch in the open position;

Figure 8 is a cross-sectional view of Figure 6 taken approximately on the line 8—8 thereof;

Figure 9 is a fragmentary cross-sectional view of Figure 6 taken approximately on the line 9—9 thereof; and Figure 10 is an end elevational view showing the electrode holder in the welding position.

Referring now to the drawings wherein the showings are for the purposes of illustrating preferred forms which the invention may take and not for the purposes of limiting the invention, the electrode holder shown in Figures 1 through 5 is comprised of a frame or stationary part A, a clamping member B coacting with the frame for clamping electrodes in the holder, a power connection C and a switch arrangement D for electrically connecting the power connection to the electrode. A welding electrode E is shown as mounted in the holder.

The frame A may take any desired form but, in the embodiment shown, is comprised of a pair of flat, relatively elongated, spaced, parallel members 10, 11 of rigid electrically insulating material, such as glass fibre reinforced hardened plastic.

The right-hand end of the members 10, 11 have aligned transverse openings in which flanged sleeves 12, 13 of metal or other wear-resisting material are press fitted. As shown, the opposed ends of these sleeves are in relatively spaced relationship. The stub end 14 of the electrode E extends through the opening of these sleeves 12, 13 and is held thereby by means of the clamping member B as will be described.

The frame A also includes elongated flat strips 16, 17 of electrically conductive material which extend along the opposed faces of the insulating members 10, 11 in spaced relationship from a point to the left of the sleeves 12, 13 to a point beyond the left-hand end of the members 10, 11. These members 16, 17 serve to carry the electric current from the power connection C to the member D.

These members 10, 11; 16, 17 are all held in assembled relationship adjacent the left-hand end of the members 10, 11 by means of a spacing block 18 and rivets 19 extending transversely through the assembled members. A pair of rivets 21, 22 extend transversely through the assembled members at a point approximately midway of the length of the members 10, 11, one located adjacent each edge. Sleeves 24 about the rivets 21, 22 space the assembled members at this point.

The power connection C to the holder is formed by means of a lug 26 on the end of a power cable 27 fastened between the left-hand ends of the electrically conductive members 16, 17 by means of a nut-and-screw arrangement 28. Obviously, any form of electrical connection to the members could be provided.

The clamping member B is formed from a sheet of flat rigid electrically insulating material and is pivotally supported relative to the frame A on a pin or shaft 30 mounted in aligned openings 30' adjacent the right-hand end of the members 16, 17.

The member B includes a handle 29 extending above and to the left of the shaft 30 and a lobe 31 extending to the right of the shaft 30 and having a lower radial surface 32. This surface is provided with a pad of wear-resisting material in the form of metallic U-shaped wire member having a base 33 extending along the surface 32 and a pair of legs 34 extending through holes to the upper surface where the ends are bent over as at 35. The member B is also cut away on its lower left-hand side to provide a shoulder 36, the purpose of which will be hereinafter described.

The member B is biased in a clockwise direction so that the lower surface of the lobe 31 will engage the stub end 14 of the electrode E when it extends through the openings of the sleeves 13, 14 and, thus, frictionally retains the electrode in the holder. Any desired means may be employed for biasing the member B to the clamping position; but, in the embodiment shown, a helical coil tension spring 37 is employed. The left-hand end of the spring 37 extends to the left for a short distance and then is reversely bent on itself as at 38 and fits into an opening 39 in the block 18. The other end of the spring 37 extends to the right as at 40 and terminates in a right-angled portion 40' which fits into an opening in the member B below the shaft 30.

When it is desired to remove the electrode from the holder or to position a new electrode in the holder, the handle 29 is depressed, thus moving the lobe 31 upwardly to clear the aligned openings of the sleeves 12, 13. When the handle 30 is released, the spring 37 moves the lobe 31 into engagement with the stub end 14.

The switching arrangement D provides an electrical connection from the electrical conducting members 16, 17 to the electrode E. Its arrangement is such that rotation of the member B so as to insert an electrode with holder opens a switch and it remains open after the member B is released.

The arrangement D in the embodiment shown is comprised of a pair of flat, generally oblong plates 41, 41' of electrically conductive material positioned one on each side of the member B and the adjacent electrically conductive members 16, 17 respectively. The members 40, 41 are pivotally supported on the shaft 30. The members 16, 17 are biased inwardly toward the members 40, 40', 41, 41' adjacent the shaft by an offset 46 (see Fig. 2) and are in electrical contact therewith. The right-hand end of the members 40, 40', 41, 41' extend generally co-extensive with the lobe 31 to a position such that when rotated in a clockwise direction, they will engage the stub end 14 of the electrode E. The other end of the members 40, 40', 41, 41' extend beyond the left-hand side of the member B for a short distance in spaced relationship and a handle 44 of electrically insulating material is positioned between this left-hand extending portion and rigidly fixed thereto by means of rivets 45 or other equivalent fastening means. As shown, the handle 44 extends downwardly and forwardly in an arcuate fashion below the frame A substantially as is shown in the figures. The upper surface 49 of the handle 44 is engaged by the shoulder 36 of the member B as the member B is rotated in a counterclockwise direction and such engagement rotates the members 40, 40', 41, 41' also in a clockwise direction away from the stub end 14 of the electrode E.

Means are provided so that when the members 40, 40', 41, 41' are rotated in a counterclockwise direction by the counterclockwise rotation of the member B, such members will remain in this counterclockwise position, even though the handle B be released to engage the stub end 14.

In the embodiment of the invention shown, a compression spring 45 extends from the block 18 to the handle 44 and is mechanically connected to the member D such that within the limits of the arc of movement of the member D, the force of the spring will pass through the axis of the shaft 30; that is to say, it will pass over a dead center. Thus, with the handle D in the position shown in Figures 1 and 3, the line of force of the spring 45 is below the axis of the shaft 30. Thus, the member D is biased in a counterclockwise direction and away from the electrode. However, when the member D is rotated in a clockwise direction so that the line of force of the spring 45 is above the axis of the shaft 30, it will be appreciated that the member D will be forcefully rotated in a counterclockwise direction to bring the member 40, 40', 41, 41' into electrical contacting relationship with the stub end 14.

The spring 45 may take a number of different shapes but, in the embodiment shown, is a leaf spring with a generally sinusoidal shape and may be compressed along the axis of the sine curve while still having a leaf-spring action. It will be appreciated that the pins 21, 22 serve as the upper and lower stops for the spring 45 and, thus, limit the arc of movement of the member D.

In the embodiment of the invention shown, the frame members 10, 11 have a reduced width just to the left of the shaft 30 and a hollow cylindrical handle of electrically insulating material fits over this reduced portion and engages the shoulder so formed. A slot 53 in the upper surface of the handle 50 provides clearance for the arcuate movement of the member B while a slot 54 in the lower right-hand edge of the member 50 provides clearance for the arcuate movement of the member D.

In operation, the handle 30 is depressed to rotate the member B in a counterclockwise direction. Such movement brings the shoulder 36 on the member B into engagement with the surface 49 of the handle 44. This also rotates the member D in a counterclockwise direction until the line of action of the spring 45 is brought to a point below the axis of the shaft 30. An electrode may then be inserted through the aligned openings of the sleeves 12, 13. The handle 30 may thereafter be released and the spring 37 biases the member B to bring the lobe 31 into frictional engagement with the portion of the stub 14 between the members 10, 11. The opposite end of the electrode may thereafter be brought into the desired welding position. When the operator desires to electrically energize the electrode, he rotates the member D in a clockwise direction until the line of action of the spring 45 is above the axis of the shaft 30. At this point, the spring 45 forcefully rotates the member D further in a clockwise direction and snaps the members 40, 41 into electrical contact with the stub 14. The electrode E is then electrically energized and the welding operation may proceed.

Figures 6 to 9 show an alternative embodiment of the invention and serve to emphasize that the invention is not limited to any one specific form.

The prime difference between the two embodiments is that in the first described embodiment, the contact surfaces which are closed to electrically energize the electrode are formed (1) by the stub end of the electrode in the holder and (2) by movable arms in the holder arranged to engage the stub end of the electrode at the will of the welding operator. In the alternative embodiment to be described, the two contact surfaces which must be closed to electrically energize the electrode are built into the holder itself.

In this alternative embodiment of the invention, the holder is comprised, generally, of an elongated, cylindrical body or frame 60 having a continuous passage 61 from one end to the other in which the mechanical parts of the holder are situated. The handle 60 is preferably formed of electrically insulating rigid material.

Adjacent the right-hand end, as viewed in Figure 6, of the body 60 is a metallic sleeve 62 which extends diametrically of the body 60 and has its outer ends flared as at 63 so as to retain the sleeves 61 in assembled relationship with the body 60. Obviously, any other means for retaining the sleeves 62 in the body 60 could be employed. The sleeve 61 has an open-ended passage 64 of a diameter to receive the stub end 14 of an electrode E of the size with which the holder is adapted to be used.

The sleeve 62 internally of the body 60 has its left-hand surface cut away so that the cross-sectional shape of the sleeve is a semicircle. Thus, when the stub end 14 of the electrode is positioned in the passage 64, its surface will be exposed to the interior of the holder. This sleeve 62 forms the fixed member of the electrode-holding jaws. Obviously this fixed member could take other forms. The movable member of the electrode holding jaws is comprised of an elongated cylindrical member 65 of electrically conductive material reciprocably supported in the passage 61. This member 65 is biased to the right; that is, into engagement with the stub end 14 of the electrode by means of a helical compression spring 66 which is coaxial with a reduced portion 67 on the member 65. This reduced portion forms a shoulder against which a washer 68 bears and the right-hand end of the spring 66 bears against this washer.

The washer 68 has an outer diameter generally equal to the diameter of the passage 61 at this point of the body 60 and, thus supports and reciprocates with the member 65 in the passage 61.

The opposite or left-hand end of the spring 66 bears against a washer 69, in turn bearing against an axially-facing shoulder in the passage 61. The internal diameter of the washer 69 is such as to be generally equal to the diameter of the portion 67 and, the portion 67 is supported thereby and reciprocates therein.

Operating means are provided for the purpose of drawing the movable jaw member 65 away from the sleeve 62 so that an electrode may be positioned in or removed from the holder. In the embodiment of the invention shown, these means comprise a rigid elongated generally L-shaped metallic member having a downwardly extending leg 70 passing through aligned slots 71, 72 in upper and lower sides of the body 60 and pivoted at the lower end on a pin 73 mounted in the body 60. This leg 70 also passes through a diametrical slot 75 in the left-hand end of the movable jaw member 65 and bears on its left-hand surface against a pin 76 which bridges the slot 75. The operating means also includes a horizontal arm 74 extending to the left generally parallel to and spaced from the outer surface of the body 60. When the arm 74 is pressed downwardly, the movable jaw member 65 is drawn to the left to permit the insertion or removal of the stub end 14 of the electrode in the sleeve 61. When the portion 74 is released, the spring 66 biases the jaw member 65 into clamping engagement with the stub end 14 and returns the arm 74 to the position shown.

As shown, the exposed surfaces of the arm 74 are covered with a thin layer 78 of electrically insulating material.

To the left of the movable jaw member 65 is a contact member 80 of electrically conductive material and generally cylindrical in shape with a collar or flange 81 intermediate its ends forming a right-facing shoulder 82 and a left-facing shoulder 83. The outer diameter of the collar 81 is generally equal to the diameter of the passage 61 at this point to reciprocably support the contact member 80 within the passage 61. A helical compression spring 85 fits over the member 80 to the left of the collar 81 and bears against the shoulder 83 to bias the member 80 in a direction toward the right into engagement with the left end of the member 65. The left-hand end of the spring 85 bears against a washer 86, in turn based on a right-hand facing shoulder in the passage 61. The internal diameter of the washer 86 is such as to reciprocably support and guide the contact member 80 as it moves against the force of the spring 85 within the passage 61. It will be noted from Figure 6 that the right-hand end of the contact member 80 is in electrical contact with the left-hand end of the movable jaw member 65. The left-hand end of the member 80 is connected to an electrically insulated power cable 88 terminating in a conventional lug 89, which lug is fastened to a flattened portion 90 on the left-hand end of the contact member 80 by suitable fastening means such as the screw 91, an opening 92 in the body 60 provides access to the screw 91.

It will thus be seen that as the jaw member 65 is reciprocated within the passage 61, the contact member 80 tends to reciprocate with it. In accordance with the invention, however, means are provided for preventing the return movement of the contact member 80 in a right-hand direction after it has been moved to the left by appropriate opening movement of the movable jaw member 65. In the embodiment of the invention shown, a toggle arrangement provides this action. Such arrangement comprises a toggle arm 94 extending generally parallel to and spaced from the lower surface of the body 60. This toggle arm 94 has an upstanding portion 95 extending into the slot 72 and pivotally supported on a pin 96 is provided. The opposite end of the toggle arm 94 extends generally to the right along the body 60 and is biased in a clockwise direction; that is, downwardly as viewed in Figure 6 by a helical compression spring 97 bearing at one end against the upper surface of the toggle arm 94 and at its opposite end against the base of an indentation 98 formed on the lower surface of the handle of body 60. The toggle arm has a toggle surface 99 to the left of the pin 96 adapted to engage the shoulder 82 when the contact member is moved to the left and to releasably retain the contact member 80 in such left-hand position, even after the movable jaw member 65 is released to move to the right.

The arrangement is clearly shown in Figure 7 wherein the right-hand surface of the contact member 80 is shown in spaced relationship with the left-hand surface of the movable jaw member 65. It will be noted that the toggle arm 94 has a layer of electrically insulating material 100 covering its entire surface. The contact member 80 is continuously energized and the toggle arm 94 is continuously in contact with the contact member 80. This insulation 100 prevents the danger of a shock when the operator presses the toggle arm 94 to release the contact member 80.

From the above description, it will be appreciated that as the movable jaw member 65 is advanced to the open position; that is, to the left, the contact member 80 is likewise moved an amount such that the toggle surface 99 of the toggle arm 94 engages the surface 82 to prevent the return movement of the contact member 80 when the movable jaw member 65 is released to clamp an electrode in the sleeve 61. Thus, electrical contact is broken automatically between the power cord 88 and the electrode holder jaws.

The welding operator may thus move the electrode holder with an electrode in it to any desired position, or even lay it down on a workpiece or otherwise without fear that an arc will be struck. Also, when placing an electrode in the holder, there is no danger of an electrical shock. When the welding operator desires to commence a weld, he simply presses the right-hand end of the toggle arm 94 against the bias of the spring 97 which, thus, releases the contact member 80 to move to the right into electrical engagement with the movable jaw member 65. The electrode is, thus, electrically energized.

The electrode holder shown has electrode jaws arranged so that the electrode will extend at generally right angles to the length of the electrode holder. Obviously, these jaws may be otherwise arranged so that the electrode may extend at any desired angle from the axial length of the holder, or the jaws may be so arranged that the electrode may be selectively positioned at any one of a number of desired angles.

The electrode holder shown may be used with any known type or method of arc welding. Thus, for conventional methods of arc welding, the welding operator is always insured that his electrode newly inserted into the holder will be electrically de-energized until he desires it to be energized and effects such re-energization by closing the contacts of the holder. Thereafter, conventional-type welding operations may proceed as with any other type of holder.

The electrode holders shown, however, are particularly adaptable for use in a novel method of welding recently developed by the assignee of this application and described in patent applications Serial Nos. 425,376; 425,377 and 425,378, filed April 26, 1954, of which the first two applications, respectively, became Patent No. 2,810,064 on October 15, 1957; Patent No. 2,784,301 on March 5, 1957, and the last application was abandoned. In the first two of such applications, a method of arc welding is described wherein a coated electrode is held at an angle of between approximately 15 to 45 degrees relative to the workpiece during the entire welding operation and with the end of the electrode always touching the workpiece. At this angle, it will be appreciated that the coating spaces the electrode from the workpiece and the arc bridges this coating to burn the electrode back. The particular novel feature of such applications is that the arcing end of the electrode is not moved either longitudinally or transversely relative to the workpiece during the welding operation. Effective relative movement is obtained solely by the electrode burn off. It is only necessary for the side of the arcing end of the electrode to be held continuously against the workpiece.

The latter of the three applications describes a match tip for welding electrodes used in welding operation, which includes electrically conductive means from the sides of the electrode to the core wire to assist in initially starting the arc without physically bringing the electrode to an angle in excess of 45 degrees relative to the workpiece to thereby bring the end of the core wire into momentary contact with the workpiece in order to start the arc.

In these applications, the electrode is provided with the proper amount of weld metal per unit length to deposit the desired amount of metal along the bead. Any longitudinal movement of the electrode and relative to the workpiece results in either too much metal being deposited per unit length of weld bead or too little, depending upon whether the longitudinal movement of the electrode end is in the direction of or away from the welding arc.

The welding operator may manually hold the electrode against such movement. The present invention, however, contemplates means, in combination with an electrode holder, to assist the operator in holding the electrode end against such longitudinal movement. Such means, in fact, enable the operator to rest the holder on the surface and permit the entire welding operation to continue unattended.

Thus, in the embodiment of the invention shown, a rest member 101 is provided which extends sidewardly from the length of the electrode holder and at an angle to the length of the electrode E. This member 101 is adapted to engage a fixed surface such as the surface of the workpiece during the welding operation and either steady the hand of the welding operator or space the electrode end of the holder from the workpiece the proper amount to maintain the desired angular relationship between the electrode and the workpiece or both.

In the embodiment of the invention shown, the member 101 is comprised of an elongated rigid wire fastened at one end to the electrode end of the holder. In the embodiment of the invention shown, the member 101 is flattened as at 102 and a screw 103 extends through the side walls of the body 60 and through an opening in the flattened end 102. A wing nut 104 adjustably holds the member 101 in assembled relationship with the holder. The opposite or free end of the member 101 has a rubber tip in the form of a sleeve 105 and serves to prevent the end of the member 101 from slipping relative to the surface on which it rests.

As viewed in Figure 10, the member 101 extends generally at right angles to the length of the body 60 of the electrode holder and to the length of the welding electrode. It thus spaces the stub end of the electrode from the workpiece a distance to provide the appropriate angle between the electrodes and the workpiece. This angle may be varied by pivoting the member 101 about the axis of the screw 103 or by varying the length of the member 101, or both. In this respect, the member 101, in itself, may be made adjustable in length. It will be noted that the axis of the screw 103 is at an angle of about 15 degrees relative to the longitudinal axis of the electrode E. This provides a steadier support of the electrode during the welding operation.

In operation, and assuming that an electrode similar to that described in the above referred to copending patent applications is employed, the electrode holder jaws are first opened by pressing down the handle 74 which withdraws the contact member 65 and prepares the holder to receive the electrode. After the handle 74 is released, however, to clamp an electrode within the jaws, the electrode is electrically de-energized. The electrode end is then positioned on the workpiece at the exact point where it is desired to start the welding operation. The end of the member 101 is thereafter brought into engagement with the surface of the workpiece. The operator thereafter presses the toggle 94 to release the contact member 80 into electrical contact with the contact member 65. The electrode thus energized strikes an arc. As the electrode end burns back, the coating continues to space the core wire from the surface of the workpiece and the arc continuously bridges the coating. The end of the electrode in contact with the workpiece does not move relative to the workpiece. It will be appreciated, however, that the holder and electrode pivot about the point where the member 101 engages the workpiece and there will thus be some slight movement of the electrode at points removed from the arcing end.

In some instances, it is possible for the operator to rest the end of the holder remote from the electrode on the surface of the workpiece and allow the welding operation to proceed without any assistance on his part. It will be noted that the member 101 may be pivoted to a position parallel to the surface of the body 60 when it is not needed or when the holder is to be packaged for shipment.

The use of the rest member 101 has been particularly described with reference to the embodiment of the invention shown in Figures 6 to 9. Obviously, such a member may be employed on the embodiment of the invention shown in Figures 1 through 5 or may be employed on any other known type of electrode holder.

It will thus be seen that embodiments of the invention have been described which accomplish all of the objects of the invention heretofore set forth and others and which provide an electrode holder having electrical switching means which are moved to and held in the open position upon operation of the electrode holder to receive a new electrode and which are reclosed by independently operated means. Also, embodiments of the invention have been disclosed which include a rest member extending from the holder adapted to engage a fixed surface during a welding operation and steady the electrode holder and electrode during such welding operation.

The invention has been described in connection with preferred embodiments. It will be appreciated that modifications and alterations differing radically in appearance from such embodiments will occur to others upon a reading and understanding of this specification and it is my intention to include all such modifications and alterations insofar as they come within the scope of the appended claims.

Having thus described my invention, I claim:

1. An arc-welding electrode holder comprising, in combination, manually operable electrode clamping means, electrical contacts for controlling the energization of an electrode in said means and operatively associated therewith to de-energize an electrode in said means when said means are manually operated to the unclamped position and other manually operable means for holding said contacts in the means de-energized position after manipulation of said clamping means to receive and clamp an electrode.

2. An arc-welding electrode holder comprising, in combination, electrode-holding means, electrical contacts controlling the energization of said means, means biasing such contacts to the closed position, manually operated means for moving such contacts to the open position and other manually releasable means for holding such contacts in the open position.

3. An arc-welding electrode holder comprising, in combination, electrode-clamping means, manual means for opening and closing such clamping means, normally closed switch means opened by opening of said clamping means to receive an electrode and manually releasable means for holding such switch means in the open position after closing of said clamping means.

4. An electrode holder having electrode clamping means and a built-in switching means for controlling the energization of an electrode in the holder, the switching means being associated with the clamping means and remaining open after an opening and closing of the clamping means to receive an electrode and manual means independent of said clamping means for closing such switch means.

5. An electrode holder comprising, in combination, electrode jaws including a movable jaw member, a handle for moving the movable jaw member to the open position, a contact member movable with the movable jaw member as it moves to the open position, means for holding the contact member in the open position as the jaw member moves to the closed position and manually actuated means for moving the contact member to the closed position to energize an electrode in the jaw members.

6. An electrode holder comprising, in combination, a body member having a fixed jaw member at one end, a movable jaw member on said body biased to the closed position, manual means for moving such movable jaw member against the bias, a contact member biased to the closed position and movable with said movable jaw member as the jaw member is moved to the open position and manually releasable means for preventing the return movement of said contact member as said jaw member is moved to the closed position.

7. The combination of claim 6 wherein said movable jaw member and contact member are reciprocably mounted on said body.

8. The combination of claim 7 wherein said contact member is biased into electrical engagement with the movable jaw member.

9. The combination of claim 6 wherein said movable jaw member and contact member are rotatably supported upon a common axis.

10. The combination of claim 9 wherein said contact member is biased to engage the stub end of an electrode held between the jaw members.

11. An electrode holder comprising, in combination, a body member having a fixed jaw member at one end, a movable jaw member on said body biased to the closed position, manual means for moving such movable jaw member against the bias, a contact member biased to the closed position and movable with said movable jaw member as the jaw member is moved to the open position, manually releasable means for preventing the return movement of said contact member as said jaw member is moved to the closed position, and means for spacing the jaw member end of said electrode from a work piece comprising a member extending sidewardly from the length of the body member at an angle to the electrode axis through the jaw members.

12. An arc welding electrode holder comprising an elongated body member having electrode clamping means at one end, such clamping means holding an electrode such that its length extends generally perpendicular to the length of the body member, and an elongated element pivotally fixed to said member adjacent said end on an axis generally parallel to the length of said electrode and extending generally perpendicular to the length of the body member and to the plane containing the length of the body member and the electrode, said element fixedly engaging a workpiece during a welding operation and spacing the clamping means from the workpiece.

13. An arc welding electrode holder comprising in combination an elongated body member having electrode clamping means at one end, such clamping means adapted to hold an electrode such that the electrode axis extends generally away from the longitudinal length of said body member, and a steady rest member pivoted to said end on an axis generally perpendicular to the longitudinal length of said body member and generally parallel to the electrode axis, said steady rest member in use extending generally perpendicular from the length of said body member and fixedly engaging a work piece during a welding operation as the electrode end burns off.

References Cited in the file of this patent

UNITED STATES PATENTS

| | | |
|---|---|---|
| 1,514,492 | Wille et al. | Nov. 4, 1924 |
| 1,729,059 | Bicsey | Sept. 24, 1929 |
| 1,770,808 | Saucer | July 15, 1930 |
| 2,151,552 | Jandos | Mar. 21, 1939 |
| 2,265,135 | Hackmeyer | Dec. 9, 1941 |
| 2,276,549 | Shellabarger | Mar. 17, 1942 |
| 2,333,192 | Moberg | Nov. 2, 1943 |
| 2,384,999 | Heinrich | Sept. 18, 1945 |
| 2,432,836 | Ternes | Dec. 16, 1947 |
| 2,692,933 | Cornell | Oct. 26, 1954 |

FOREIGN PATENTS

| | | |
|---|---|---|
| 335,164 | Germany | Mar. 24, 1921 |
| 191,704 | Great Britain | Oct. 11, 1922 |
| 433,254 | Italy | Apr. 5, 1948 |
| 609,782 | Great Britain | Oct. 6, 1948 |
| 623,304 | Great Britain | May 16, 1949 |